United States Patent [19]

Lupke

[11] Patent Number: 5,545,369
[45] Date of Patent: Aug. 13, 1996

[54] CLAMSHELL CORRUGATORS AND THE LIKE

[75] Inventor: Manfred A. A. Lupke, Thornhill, Canada

[73] Assignee: Corma, Inc., Concord, Canada

[21] Appl. No.: 117,946

[22] Filed: Sep. 8, 1993

[51] Int. Cl.$^6$ .............. B29C 33/26; B29C 49/04
[52] U.S. Cl. .......... 264/508; 264/571; 264/DIG. 78; 425/233; 425/326.1; 425/336; 425/388
[58] Field of Search ............... 264/508, 505, 264/515, 571, DIG. 78; 425/233, 326.1, 325, 336, 396, 532, 388, 451

[56] References Cited

U.S. PATENT DOCUMENTS

| | | | |
|---|---|---|---|
| 3,751,541 | 8/1973 | Hegler | 264/508 |
| 3,776,679 | 12/1973 | Hegler | 425/396 |
| 4,199,314 | 4/1980 | Lupke et al. . | |
| 4,439,130 | 3/1984 | Dickhut et al. . | |
| 4,492,551 | 1/1985 | Hegler et al. | 264/508 |
| 4,504,206 | 3/1985 | Lupke et al. . | |
| 4,662,428 | 5/1987 | Trendov . | |
| 4,681,526 | 7/1987 | Lupke | 425/336 |
| 4,710,337 | 12/1987 | Nordström | 156/244.14 |
| 4,718,844 | 1/1988 | Dickhut et al. | 425/336 |
| 4,787,598 | 11/1988 | Rahn et al. | 425/396 |
| 4,900,503 | 2/1990 | Hegler et al. | 264/508 |
| 4,911,633 | 3/1990 | Comfort . | |
| 4,952,362 | 8/1990 | Järvenkylä et al. | 425/233 |
| 5,002,478 | 3/1991 | Lupke . | |
| 5,059,109 | 10/1991 | Dickhut et al. | 425/532 |
| 5,123,827 | 6/1992 | Lupke | 425/133.1 |
| 5,257,924 | 11/1993 | Dickhut et al. | 264/508 |
| 5,372,774 | 12/1994 | Lupke | 425/326.1 |
| 5,393,211 | 2/1995 | Hegler et al. | 264/508 |

*Primary Examiner*—Jeffery R. Thurlow
*Attorney, Agent, or Firm*—Beveridge, DeGrandi, Weilacher & Young

[57] ABSTRACT

An improved, endless mold tunnel, clamshell-type, thermoplastic tube molding apparatus and method using exteriorly disposed, compressive roller elements and a cooperating keyway/matching lug assembly for maintaining the alignment of the independent mold blocks and mold block half sections substantially orthogonal relative to opposed half sections and relative to the contiguous upstream and downstream mold blocks in said tunnel while allowing for the introduction of cooling fluid or vacuum.

13 Claims, 4 Drawing Sheets

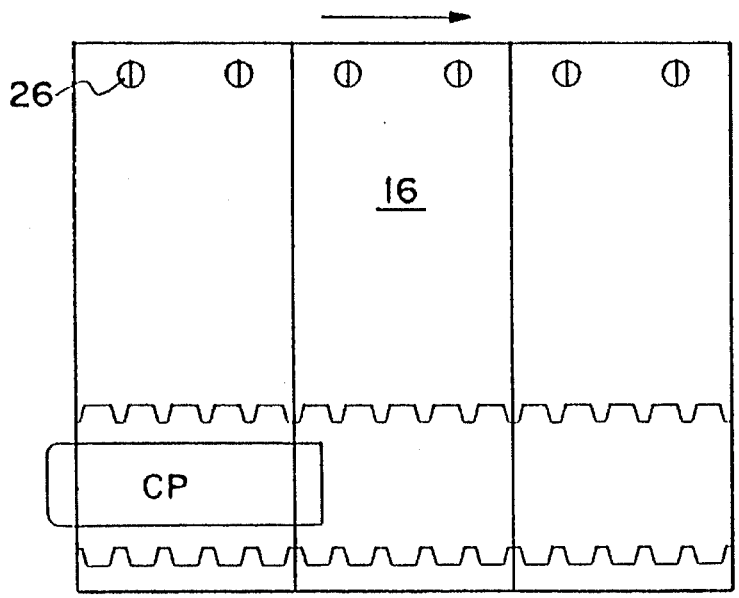
FIG. 2
PRIOR ART
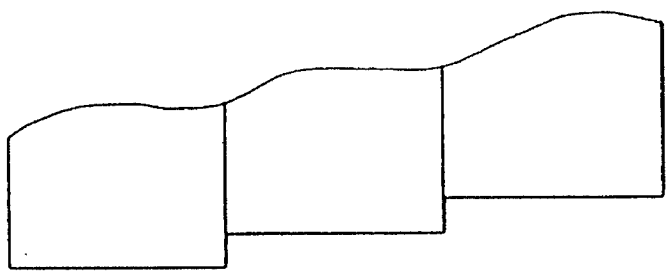
FIG. 3
PRIOR ART
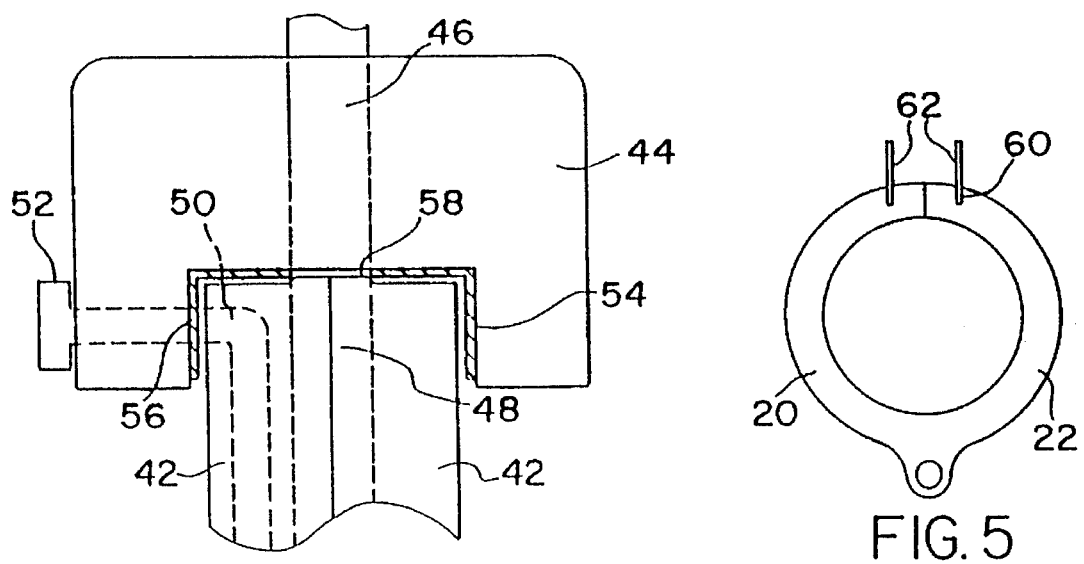
FIG. 4
FIG. 5

CLAMSHELL CORRUGATORS AND THE LIKE

TECHNICAL FIELD

The invention relates to improvements in individual clamshell mold section type, endless mold tunnel apparatus for molding thermoplastic tubing. More particularly, this invention relates to an auxiliary alignment and guide means for maintaining clamshell mold sections in substantially orthogonal alignment relative to the direction of travel of the mold tunnel.

BACKGROUND OF THE INVENTION

Clamshell type mold tunnel apparatus using independent mold sections for production of extruded thermoplastic tubing, and particularly, profile tubing, have found use in the pipe forming industry. Descriptions of clamshell tubing apparatus are found in U.S. Pat. No. 4,439,130 Dickhut et al and U.S. Pat. No. 4,911,633, Comfort. These patents are incorporated herein by reference.

Clamshell type extrusion apparatus may produce profile pipe with undesirable surface irregularities. Such irregularities may impact on the appearance and or performance of the finished mold tubing product. For example, interior irregularities adversely impact on performance, e.g., by increasing flow turbulence. Exterior irregularities are undesirable on grounds of aesthetics. It has been suggested that such irregularities become more pronounced in large diameter profile tubing and double wall tubing produced by clamshell molding extrusion apparatus. Also it is reported that clamshell molding extrusion devices employing a "quick return" feature to reduce the number of individual mold blocks required for molding, suffer from alignment problems leading to undesirable irregularities. (A "quick return" feature in thermoplastic tubing molding apparatus is described in U.S. Pat. No. 4,504,206 issued to Lupke on Jan. 12, 1983, incorporated herein by reference.)

Misalignment is a common concern arising from the use of the prior art clamshell devices, whether direct drive of independent mold blocks or inter-linked chain drive. Individual clamshell mold sections are used to establish a travelling mold tunnel to profile a thermoplastic parison and form corrugated or ribbed pipe (See FIG. 2). Not only are the opposed mold block sections prone to separate from one another opposite the hinge connection, but also as a thermoplastic extrudate cools, it hardens and its viscosity increases, all within a travelling mold tunnel. These physical changes impart progressively increasing drag on the mold blocks and unless the extrudate is very thin, the additional, increasing drag tilts (cants) the mold blocks relative to one another. (See FIG. 3) That is, the unhinged portion of the mold block section opposite of the driving linkage, has a tendency to become misaligned (not square) relative to the immediately adjacent mold block and the mold tunnel. As the length to width ratio of the mold tunnel increases, the tilting/canting of one mold block creates a cascade effect where one mold block pushes against the two contiguous (front and back) mold blocks which in turn, may exert additional de-stabilizing force on the originally misaligned mold block section (refer to FIG. 3). Thus, the canting can become progressively worse along the mold tunnel length resulting in defective profiling of the molded thermoplastic tube. The prior art devices, as represented by U.S. Pat. No. 4,439,130 did not recognize the drag problem or the cascade effect of canting. Instead, referring to FIG. 1, the prior art relied on a combination of a guide G directly engaging the support carriage 24 and rollers R and cam followers C to not only pivot the clamshell sections between the open and closed positions but also to positionally stabilize the clamshell sections.

SUMMARY OF THE INVENTION

It is therefore an object of the present invention to overcome the problems associated with the prior art.

It is another object of this invention to provide a solution to the tilting problem in prior art clamshell type extrusion apparatus.

Another object of this invention is to maximize orthogonal alignment of individual clamshell mold block sections used to form a mold tunnel.

It is further object of this invention to provide an relatively simple solution to minimize misalignment of clamshell mold sections and to improve the consistency of the form of the thermoplastic tubing molded therefrom.

It is another object of the present invention to provide profile thermoplastic tube from a clamshell mold tunnel apparatus with a minimum of interior and exterior surface irregularities.

Still another object of this invention is to provide structural flexibility permitting communication of fluid and/or vacuum through the mold block sections to the parison.

These and other objects are satisfied by a thermoplastic tubing profiling apparatus for receiving plastic from an extruder to form profile thermoplastic tubing, comprising: a frame having a forward trackway defining a mold tunnel; a plurality of independent clamshell-type mold assemblies, each disposed on said trackway, each of said mold assemblies pivotally opening and closing a pair of mating mold blocks which when closed define a segment of the mold tunnel; means for driving said mold assemblies along said trackway, alignment means for maintaining the alignment of each of said mold blocks substantially orthogonal relative to its mate and relative to the contiguous mold blocks in said tunnel.

Still other objects are satisfied by a method for forming thermoplastic tubing using a mold tunnel formed from at least two individual clamshell-type mold sections, comprising the steps of:

a) positioning an individual mold section about the beginning of a mold tunnel, b) causing the clamshell half sections to pivot to a closed position and mate to thereby establish a first section of the mold tunnel;

c) causing the first section of the mold tunnel to abut a second section of the mold tunnel;

d) providing an alignment element for contacting the first section of the mold tunnel;

e) maintaining each half section in substantial orthogonal alignment relative to its mate; and f) maintaining the first section in substantial orthogonal alignment relative to the second section of the mold tunnel.

The invention herein provides an improved clamshell mold tunnel arrangement. The improvement is based on use of alignment elements; compression/pincher rollers engaging and compressing against the exterior annular surface of the mold block sections when closed and comprising part of the mold tunnel and a projecting lug/keyway. The use of these elements prevents separation of a mated pair of mold blocks and misalignment of contiguous mold blocks.

The prior art clamshell apparatus actually discouraged the inclusion of such devices by stressing the criticality of and non-interference with other structures believed to be necessary. For example, such alignment maintenance elements would interfere with the plenum structures for controlling airflow over the mold block section exterior for cooling purposes (See U.S. Pat. No. 4,439,130).

The inventor herein does not believe the need for such a plenum is critical since reliance on air cooling can be reduced by the use of internally cooled mandrels and mold block sections as suggested, for example, in Lupke U.S. Pat. No. 5,186,878 and Lupke, U.S. Pat. No. 5,002,478 (incorporated herein by reference). (See also FIG. 2 cooling plug designated "CP").

The use of the invention herein, therefore, substantially reduces, if not eliminates altogether, separation and misalignment of the individual mold block sections upstream and downstream as well as relative to its opposable mate due to the inclusion of the keyway/lug arrangement. Similarly, the compression/pincher rollers of this invention maintain the mold block sections in substantial orthogonal alignment relative to each other in the mold tunnel.

As is clear, it is important to maintain the alignment of mold sections in the production of profile tubing. Mold section alignment is particularly important in the production of double wall pipe and or large diameter profile tubing, processes which typically employ a cooling plug, vacuum source and/or pneumatic elements which are described, for example, in U.S. Pat. No. 4,545,751 issued to Lupke on Oct. 8, 1985, and U.S. Pat. No. 5,186,878 issued to Lupke on Feb. 16, 1993, both incorporated by reference herein.

The invention herein should become clear to the person having ordinary skill in the art upon review of the drawings and the following detailed description thereof.

BRIEF DESCRIPTION OF THE DRAWING

FIG. 2 is a stylized side view of a clamshell mold tunnel.

FIG. 3 is a stylized side view representative of a prior art clamshell canting problem.

FIG. 4 is a schematic front view of a cooperating keyway/lug guide arrangement according to an embodiment of this invention.

FIG. 5 is a stylized representation of an alternative locking ring guide arrangement according to another embodiment of this invention.

BEST MODE FOR CARRYING OUT THE INVENTION

Figure 1:
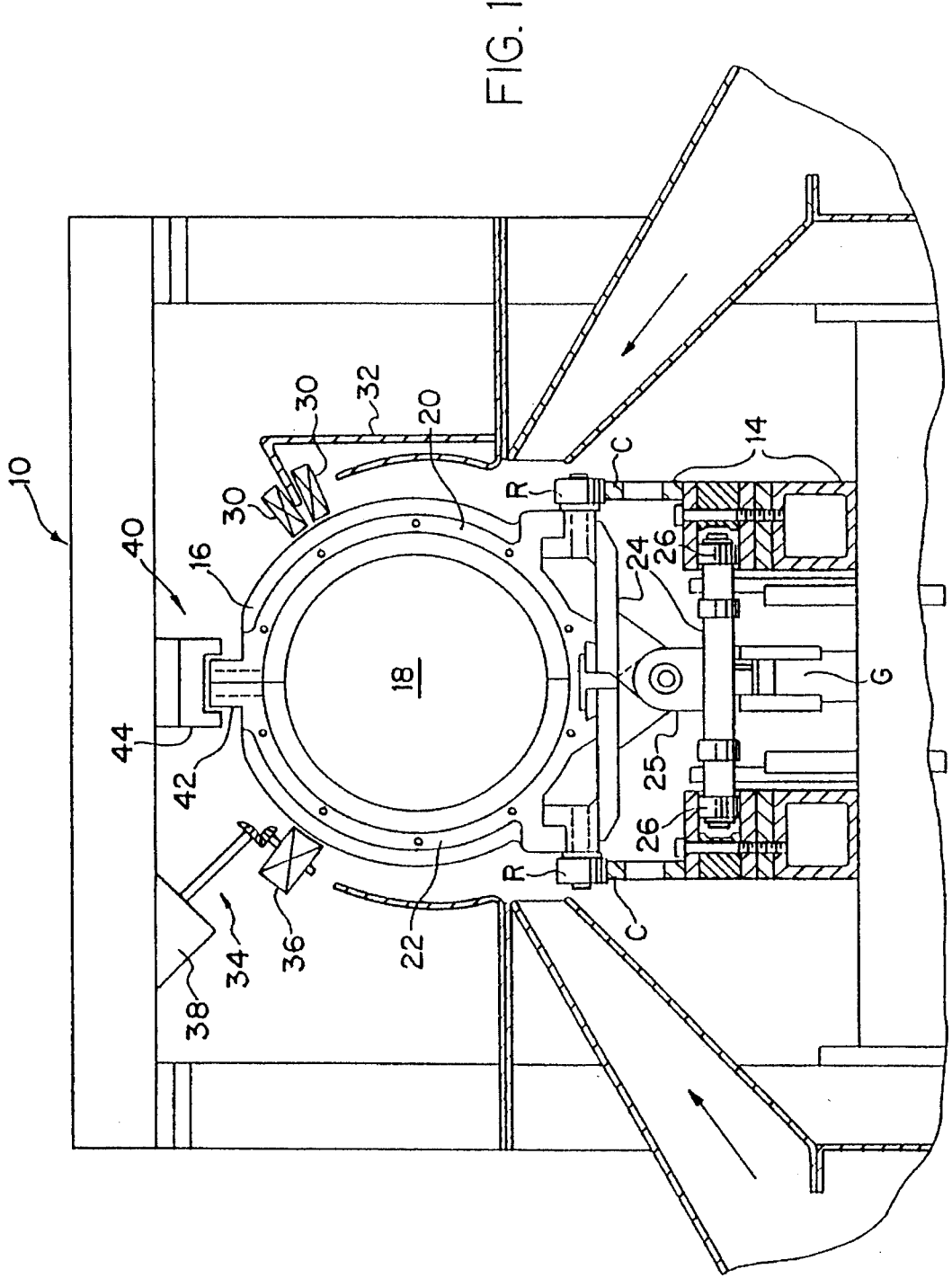
FIG. 1 is a front cutaway view of a clamshell mold tunnel embodiment according to the invention.

FIG. 1 corresponds to FIG. 4 of the above-referenced patent, U.S. Pat. No. 4,439,130 (incorporated herein by reference), but modified in accordance with this invention. Certain of the features disclosed in FIG. 1, were contained in the earlier '130 patent.

FIG. 1 depicts a tile corrugator 10 supported within frame 12. The corrugator 10 defines forward track assemblies 14 and a "quick return" track (not illustrated), which together with transitional tracks, provide an endless, elongated rolling trackway contained by the corrugator 10. Both of the forward and return tracks are secured to the frame 12 and are adapted to rollingly receive the mold block sections 16 and permit rolling translation of the independent mold block sections thereabout. On the forward run, the tracks and the individual mold block sections 16 cooperate to establish the mold tunnel 18.

Each mold block section 16 includes two mating, semi-cylindrical, mold blocks halves 20 and 22 (clamshell sections). Each of right and left half sections 20 and 22 may include profiling features (ridges and grooves), or may be smooth for smooth wall pipe or a smooth inner wall of two walled profiled tubing. Each of the clamshell sections 20 and 22 are pivotally mounted with a hinge/pivot pin 25 on a supporting carriage 24. Each supporting carriage 24 includes coaxial pairs of outwardly extending axles 26 which engage the carriage drive source for translating the carriages about the trackway. The axles 26 are dimensioned to freely translate within the trackways defining the forward and return runs, thereby enabling guided, linear translation of the mold section 16 in an endless manner about the corrugator 10.

As the individual mold sections translate about the trackway, the half sections pivot between an open and a closed positions based on conventional means, e.g. camming surfaces and rolling followers. At the beginning of the forward run establishing mold tunnel 18, each of the half sections are pivoted together to mate with its opposed half section. At the end of the forward run, the half sections are pivotally separated in order to allow the mold section 16 to rotate away from the molded pipe and move to the "quick return" run.

The operational and quality improvement provided by the invention herein is predicated on the substantial reduction, if not elimination, of separation and misalignment of the individual mold block half sections 20 and 22 while forming and in the mold tunnel 18. Such reductions are achieved using a plurality of compression/pincher roller pairs 30 which are disposed along the length of the mold tunnel 18. The pincher roller pairs 30 may comprise single rollers but, preferably, when passive, comprise dual rollers as depicted in FIG. 1. The rollers should be disposed at least approximately 30° on the arc away from the hinge 25. Preferably, the rollers are oppositely disposed at from 75° to 160° relative to the clamshell hinge 25 to contact and compress the clamshell sections in a substantially balanced manner. Most, preferably, the rollers are positioned at about 130°–140° from the hinge 25.

The rollers 30 depicted in FIG. 1 are passive and are mounted on bracket 32. The mounted passive roller pair imparts normalizing force on the mold block half section 20 to maintain the section orthogonal both with respect to opposing, mating half section 22 and the corresponding upstream and downstream mold block half sections 20. Preferably, the compression rollers 30 are mounted to rotate about a line normal to a radius of the mold tunnel 18. Consequently, the rollers, if in paired sets, are not disposed parallely on the bracket 32 (See FIG. 1). Such alignment maximizes contact surface and minimizes wear.

It is preferred when relying entirely on passive rollers, that a corresponding, matched roller pair 30 be oppositely positioned relative to mold block half section 22 to provide opposed compressive force. It is also preferred that multiple rollers 30 be provided along the length of the mold tunnel 18 to operatively maintain the orthogonal alignment of mold block halves the entire length of the mold tunnel.

Preferably, the ratio is about one bracket to at least every two or three mold block sections, and even a one-to-one bracket to mold block section ratio along the mold tunnel. However, where only one roller set is employed, it is preferably positioned proximate to the front end of the mold tunnel to engage the mold block section halves shortly after they pivot to the closed position.

With respect to the composition of the rollers 30, it is preferred that they be composed of an engineered, relatively hard elastomeric material, e.g. BSR (butadiene-styrene rubber), in order to assure maximum compression and minimum wear on the exterior of the mold block sections. The use of an engineered rubber assures positive frictional engagement with the associated mold block half section. Also such materials desirable since they are readily fabricated and permit incorporation of select mounting hardware such as pins. Thus, the rollers 30 are easily mounted (and replaced) on the bracket 32 and freely rotate relative thereto.

It may be desirable in certain applications, to incorporate a rotating actuating means to impart rotational force through the rollers rather than provide passive rollers (c.f., rollers 30). On one side of FIG. 1, an active roller assembly 34 is depicted which is associated with mold block half section 22. The active drive roller assembly 34 includes a hard rubber compression thrust roller 36 drivingly connected through appropriate linkage to rotating drive motor 38. As an alternative to an independent drive motor, the drive motor linkage may be connected by a rotating force take-off linkage associated with the mold tunnel carriage drive source.

It is recommended that the drive roller 34 be located within three axial section lengths of the beginning of the mold tunnel 18 and/or proximate to the axial position of the extrudate nozzle. In this manner, the cascade effect of any separation or canting of a particular mold section should be minimized. It is also possible to position a number of such drive rollers along the length of the mold tunnel or to combine the drive rollers with passive rollers. Also to avoid introducing positionally de-stabilizing forces, e.g., the roller itself imparting drag on the mold section, it is suggested that the tangential velocity of the drive roller 36 rotation be governed to substantially equal the translation rate of the mold tunnel 18. In the foregoing arrangements, the thrust roller(s) serve to maximize mold block positional stability and minimize irregularities in the finished molded tubing.

The next specific alignment feature contemplated by this invention is a locking keyway/lug assembly 40 prevents such separation. The keyway/lug assembly 40 aids to prevent the separation of the mating half mold block sections 20 and 22.

The keyway/lug assembly 40, depicted in greater detail in FIG. 4, combines the lugs 42 on the separable mold block section ends to form a key that cooperates with a track/keyway 44. The lugs 42 may be retrofitted by appropriate attachment to existing clamshell structures or may be provided as a part of original equipment. In either case, the lugs 42 may incorporate engineering features such as vacuum and fluid communication channels for passage between a source and the travelling mold block sections.

The keyway 44 is dimensioned to accommodate the combined lugs 42 for a selected distance along the path of mold tunnel travel. It should be apparent that the maximum length of the keyway 44 is substantially equal to the length of the mold tunnel, i.e., coextensive with the closed mold blocks 16. If the keyway/lug assembly 40 is intended to provide a guiding function during the pivotal closing and opening of the mold block sections 16, the entrance of the keyway 44 is flared to accommodate the translation of the slightly separated lugs 42 to wedge (or cam against the keyway walls). Correspondingly, the keyway may be flared at the end of the mold tunnel to limit the pivotal separation of the mold half sections. Hence, flaring the ends (termini) of keyway 44 facilitates translation of lugs 42 and minimizes spurious vibration that can be induced by the pivoting of the mold block sections.

Along the mold tunnel length, the dimensions of the elongated keyway 44 and the combined lugs 42 are closely matched so as to provide for straight and non-binding translation. The closely matched dimensions serve to minimize wear from and to prevent binding of the lugs in the keyway. Also close tolerances permit provision of and controlled introduction of vacuum and/or cooling fluid into the mold block sections through the lug/keyway interface (See FIG. 4). As represented in FIG. 4, the keyway 44 is provided with vacuum channel 46 which communicates vacuum from a source through the keyway and to vacuum channel 48 formed by cooperating lugs 42. Correspondingly, fluid for warming or cooling can be introduced via coupling 52 through the keyway 44 to fluid channel 50 to communicate the fluid into the mold sections.

Particularly in the case of fluid or vacuum introduction, it is preferred to provide a relatively tight fit and possibly wiping, positive contact between lugs 42 and the keyway 44. As depicted, in such an arrangement, it is preferred that the interior surfaces of the keyway 44 or, alternatively, the exterior surfaces of the lugs 42 which confront the keyway, be coated with a friction reducing agent 54, e.g. lubricant, or even the more expensive polytetrafluoroethylene (Teflon®), etc. Also to assist in the respective communication channels, the lugs 42 may be provided with terminal annular rings 56 and 58 to promote positive engagement with the fluid channels.

The use and operation of the invention as generally described in FIGS. 1 and 4, are now recited. During operation of the corrugator 10, the mold blocks halves 20 and 22 of the mold block sections 16 pivotally close upon commencement of the forward run in forward trackway 14 to form the molding tunnel 18. After closing, the pincher rollers (passive and/or driven) engage the outer surface of the mold block halves. Also, the terminal lugs 42 of the mold block halves, after pivoting together, enter the keyway 44.

When provided with a flared keyway opening, the closing and opening action is assisted by the flare and undesirable vibration and wear is reduced since the alignment of the lugs 42 within the keyway is before the half sections are completely mated and may assist in the alignment thereof. Hence, the improved guide structures maintain contiguous mold block sections 16 orthogonal to molding tunnel axis and maintain opposing half sections 20 and 22 in proper compressive alignment.

Toward the terminus of the mold tunnel, the mold block sections are pivoted apart by the action of rollers R on a slanted camming surface C, into the open position and carried around a semi-cylindrical transitional track to a "quick return" track.

The velocity of translation of the mold block section along the quick return track is substantially greater than the rate of travel of the mold tunnel. At the end of the "quick return" run, the individual mold block section moves about a second semi-cylindrical transition track to the beginning of the forward run.

Certain variations of the above described structures are now considered. In FIG. 5, a simple variation of a mold block section locking element is depicted. Each of mold block sections 20 and 22 include an elongated groove 60. The grooves 60 are adapted to receive and have translate therethrough, locking tines 62, which in turn are secured to the tunnel frame or equivalently positionally secure structure.

Figure 6:
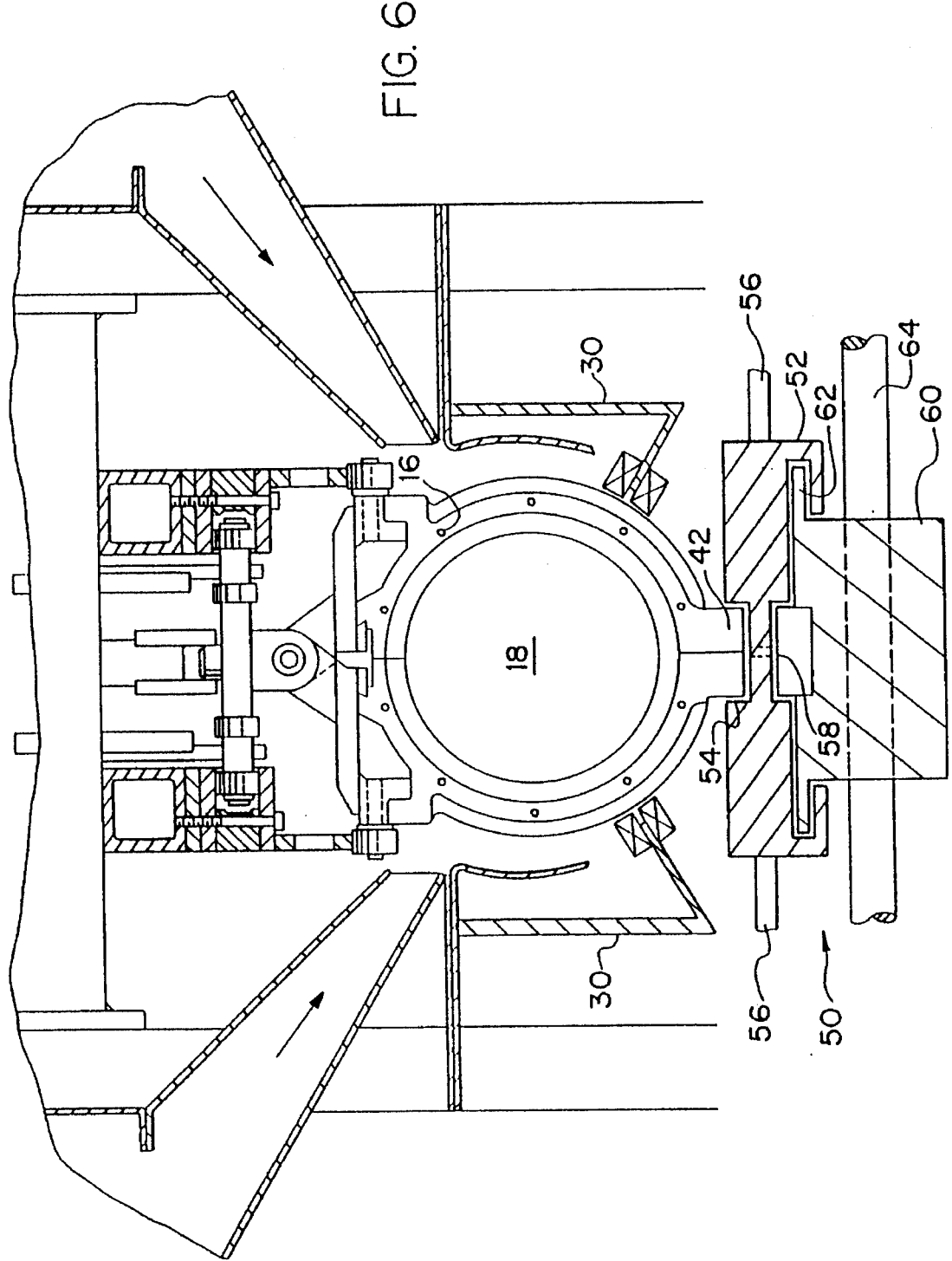
FIG. 6 is a front cutaway view of a further variation of a keyway/lug assembly according to this invention.

FIG. 6 represents a further modification of the keyway/lug assembly. The embodiment of FIG. 6, generally represents the combination of a keyway/lug assembly of FIG. 4 with modified mold block carriers disclosed in Lupke U.S. Pat. No. 5,002,478, referenced-above. In this case, the lugs 42 mate with a carrier block assembly 50.

The carrier block assembly 50 includes a rolling keyway 52 which forms a notch 54 sized for accommodating lugs 42. The carrier block assembly 50 incorporates oppositely disposed roller shafts 56 which translate in a track incorporated in the corrugator apparatus generally paralleling the forward run. The rolling keyway 52 also incorporates a vacuum communication channel 58 for communicating suction from a source (not illustrated) to the mold section 16 and is securely seated on keyway carrier 60 through tongue and groove connection 62. The movement of assembly 50 is tuned to the speed of translation of the associated mold section 16 by a drive shaft linkage 64 incorporated in the keyway carrier 60 and connected to the carriage drive source for the mold block 16.

By using the modification of FIG. 6, the individual mold sections are locked into and driven by the carrier block assembly 50 providing for positive engagement of the closing half sections by the keyway 54. Additionally, fluid communication can be provided via the assembly 50 much the same as it is provided through keyway 44 described in FIG. 4.

Figure 7:
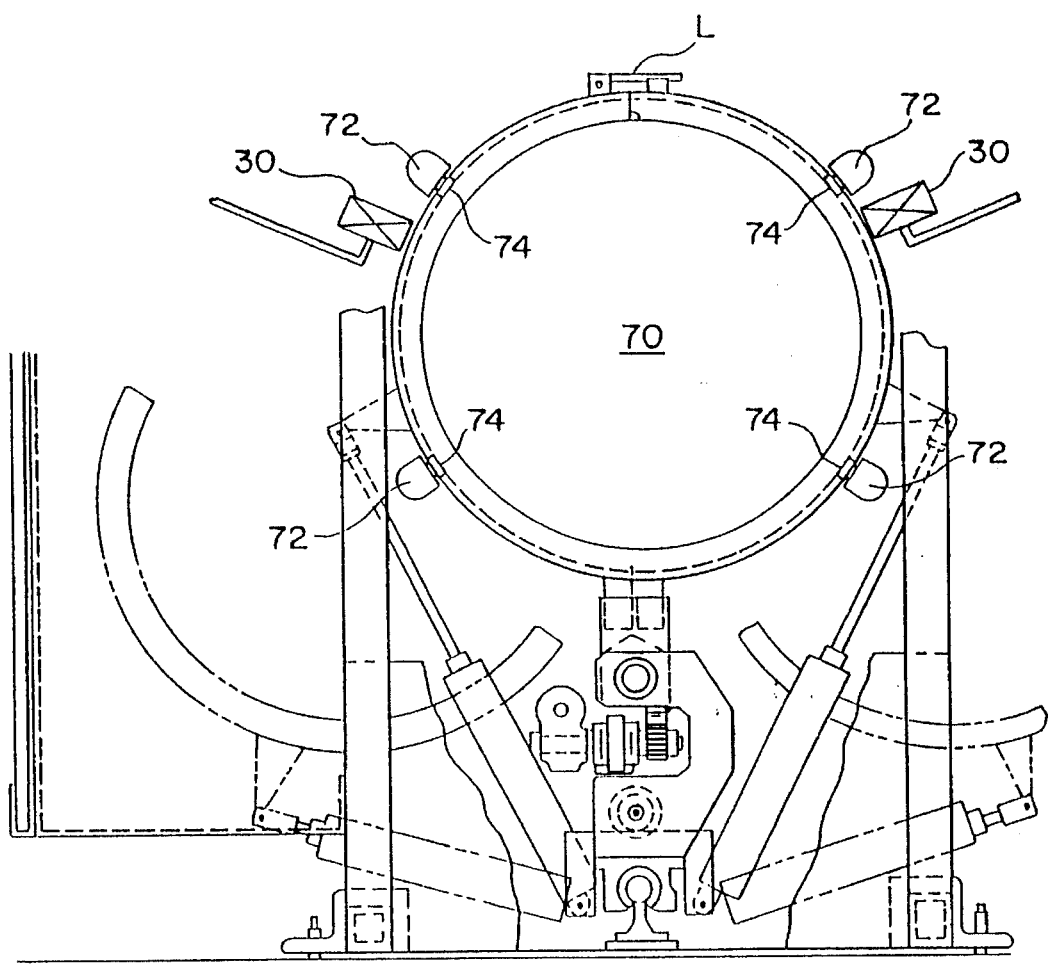
FIG. 7 is a front cutaway view of a further embodiment of a clamshell mold tunnel according to the invention.

FIG. 7 represents a further variation of the invention which is intended to underscore the design flexibility of the invention. For example, it may be desirable to incorporate an adjunct clamping device (designated L) for preventing the separation of the lugs 42. The inclusion of such an adjunct clamp may interfere with the introduction of vacuum through a communication means such as lugs 42 as depicted in FIG. 4. Thus, in another embodiment of this invention, multiple fluid communication channels and/or vacuum input ports 72 are disposed about the periphery of the mold tunnel 70.

As depicted in FIG. 7, manifolds 72 and corresponding ports 74 are located proximate to the compression rollers 30 on each side of the mold tunnel. Accordingly, this invention contemplates in at least one embodiment, the use of vacuum manifolds for communicating vacuum from a source to the mold tunnel via a plurality of ports formed in the periphery of the mold block sections. Such an arrangement would be particularly helpful in a reciprocating translatable mold section shuttle arrangement as depicted in U.S. Pat. No. 4,911,633.

INDUSTRIAL APPLICABILITY

This invention is directed to and particularly helpful in the production of extruded, profiled, thermoplastic tubing using a mold tunnels formed from an endless train of individual clamshell-type molding sections. This invention minimizes the distortions in of the exterior and interior tube walls occasioned by tilting/canting of the individual mold sections relative to one another.

Given the foregoing, variations and modifications to the invention should now be apparent to a person having ordinary skill in the art. These variations and modifications are intended to fall within the scope and spirit of the invention as defined by the following claims.

What is claimed is:

1. A thermoplastic tubing profiling apparatus for receiving plastic from an extruder to form profile thermoplastic tubing, comprising: a frame having a forward trackway defining a mold tunnel; a plurality of independent clamshell mold assemblies, each having a front face, a rear face, and a first and second ends, each disposed on said trackway, each of said mold assemblies pivotally opening and closing a pair of mating mold blocks connected at the first end thereof by a hinge which when closed define a segment of the mold tunnel; means for driving said mold assemblies along said trackway, alignment means for maintaining the alignment of each of said hingedly connected mold blocks substantially orthogonal relative to its mate and relative to contiguous mold blocks in said tunnel, said alignment means is associated with the exterior of the mold blocks and includes a matching set of projecting lugs from the second end of each of said mold block pairs and a keyway dimensioned to correspond to said lugs, said means to maintain alignment being established by the cooperation of said keyway and lug assembly and said mold assemblies are each rollably disposed on said trackway and said mold assemblies are driven to rollably circulate about said trackway and a vacuum communication channel for communicating vacuum through said lugs and into said hingedly connected mold blocks.

2. A thermoplastic tubing profiling apparatus for receiving plastic from an extruder to form profile thermoplastic tubing, comprising: a frame having a forward trackway defining a mold tunnel; a plurality of independent clamshell mold assemblies, each having a front face, a rear face, and a first and a second ends, each disposed on said trackway, each of said mold assemblies pivotally opening and closing a pair of hingedly connected mating mold blocks which when closed define a segment of the mold tunnel said mold blocks being pivotally connected together at the first end by a hinge; means for driving said mold assemblies along said trackway, alignment means for maintaining the alignment of each of said mold blocks substantially orthogonal relative to its mate and relative to contiguous mold blocks in said tunnel where said alignment means is associated with the exterior of the mold blocks and includes a matching set of projecting lugs from the second end of each of said mold block pairs and a keyway dimensioned to correspond to said lugs, said means to maintain alignment being established by the cooperation of said keyway and lug assembly and said mold assemblies are each rollably disposed on said trackway and said mold assemblies are driven to rollably circulate about said trackway, and a fluid communication channel for communicating fluid through said lugs and into said mold blocks.

3. A thermoplastic tubing profiling apparatus for receiving plastic from an extruder to form profile thermoplastic tubing, comprising: a frame having a forward trackway defining a mold tunnel; a plurality of independent clamshell mold assemblies, each having a front face, a rear face, and a first and a second ends, each disposed on said trackway, each of said mold assemblies pivotally opening and closing a pair of mating mold blocks which when closed define a segment of the mold tunnel; means for driving said mold assemblies along said trackway, alignment means for maintaining the alignment of each of said mold blocks substantially orthogonal relative to its mate and relative to contiguous mold blocks in said tunnel where said alignment means is associated with the exterior of the mold blocks and includes an elongated groove formed in each of said mold blocks at the second end thereof and a tine dimensioned to be received within each of said grooves, said means to maintain alignment being established by the cooperation of said groove and tine.

4. A thermoplastic tubing profiling apparatus for receiving plastic from an extruder to form profile thermoplastic tubing, comprising: a frame having a forward trackway defining a mold tunnel; a plurality of independent clamshell mold assemblies, each disposed on said trackway, each of said mold assemblies pivotally opening and closing a pair of mating mold blocks which when closed define a segment of the mold tunnel; means for driving said mold assemblies along said trackway, alignment means for maintaining the alignment of each of said mold blocks substantially orthogonal relative to its mate and relative to contiguous mold blocks in said tunnel where said alignment means includes a matching set of projecting lugs from the second end of each of said mold block pairs and a keyway dimensioned to correspond to and receive said lugs, said lugs featuring a vacuum communication channel for communicating vacuum to the mold blocks, and said alignment means is associated with the exterior of the mold blocks and includes a roller element for maintaining the alignment of the mold blocks, said roller element being positioned to make compressive contact with the exterior of at least one of said mold blocks along the mold tunnel.

5. The thermoplastic tubing profiling apparatus according to claim 4 where the mold sections are each rollably disposed on said trackway and said mold assemblies are driven to rollably circulate about said trackway, said roller means includes at least one pair of rollers disposed on each side of and at the beginning of the mold tunnel.

6. The thermoplastic tubing profiling apparatus according to claim 4 where said roller means includes actuation means to cause said roller to rotate at an angular velocity substantially equal to the speed of translation of said mold tunnel.

7. A thermoplastic tubing profiling apparatus for receiving plastic from an extruder to form profile thermoplastic tubing, comprising: a frame having a forward trackway defining a mold tunnel; a plurality of independent clamshell mold assemblies, each disposed on said trackway, each of said mold assemblies pivotally opening and closing a pair of mating mold blocks each having a front face, a rear face, and a first and a second ends, which when closed define a segment of the mold tunnel; means for driving said mold assemblies along said trackway, lugs for maintaining the alignment of each of said mold blocks substantially orthogonal relative to its mate and relative to contiguous mold blocks in said tunnel, where said lugs are disposed at the second end the mold blocks, are associated with the exterior of the mold blocks, and include a carrier block assembly including a rolling keyway, a carrier block, and a drive shaft drivingly connecting said carrier block to said means for driving said mold blocks, and a vacuum communication channel for communicating vacuum through said lugs and into said mold blocks.

8. The thermoplastic tubing profiling apparatus according to claim 7 where said alignment means further includes a matching set of projecting lugs from each of said mold block pairs and a keyway dimensioned to correspond to said lugs, said means to maintain alignment being established, in part, by the cooperation of said keyway and lug assembly.

9. A thermoplastic tubing profiling apparatus for receiving plastic from an extruder to form profile thermoplastic tubing, comprising: a frame having a forward trackway defining a mold tunnel; a plurality of independent clamshell mold assemblies, each disposed on said trackway, each of said mold assemblies pivotally opening and closing a pair of mating mold blocks each having a front face, a rear face, and a first and a second ends, which when closed define a segment of the mold tunnel; means for driving said mold assemblies along said trackway, alignment means for maintaining the alignment of each of said mold blocks substantially orthogonal relative to its mate and relative to contiguous mold blocks in said tunnel where said alignment means is associated with the exterior of the mold blocks and is a thrust roller element for maintaining the alignment of the mold blocks, said thrust roller element being positioned to make compressive contact with the exterior of at least one of said mold blocks along the mold tunnel, and a vacuum communication channel associated with said alignment means for communicating vacuum through said lugs and into said mold blocks.

10. A thermoplastic tubing profiling apparatus for receiving plastic from an extruder to form profile thermoplastic tubing, comprising: a frame having a forward trackway defining a mold tunnel; a plurality of independent clamshell-type mold assemblies, each rollably disposed on said trackway, each of said mold assemblies pivotally opening and closing a pair of mating mold blocks which when closed define a segment of the mold tunnel; means for driving said mold assemblies to rollably circulate about said trackway, alignment means for maintaining the alignment of each of said mold blocks substantially orthogonal relative to its mate and relative to the contiguous mold blocks in said tunnel, said alignment means including: a matching set of projecting lugs from each of said mold block pairs and a keyway dimensioned to correspond to said lugs, said means to maintain alignment being established by the cooperation of said keyway and lug assembly; and a roller element for maintaining the alignment of the mold sections, said roller element being positioned to make compressive contact with the exterior of at least one of said mold blocks along the mold tunnel.

11. The method of forming thermoplastic tubing using a travelling mold tunnel formed from at least two individual clamshell mold half portions, comprising the steps of:

a) positioning a pair of individual clamshell mold half portions about the beginning of a mold tunnel, b) causing the clamshell half portions to pivot to a closed position and mate to thereby establish a first section of the mold tunnel;

c) causing the first section of the mold tunnel to abut a second section of the mold tunnel;

d) providing an alignment element with a vacuum communication channel for aligning the first section of the mold tunnel and providing vacuum to the mold tunnel sections through said alignment element;

e) maintaining each clamshell half portion in substantial orthogonal alignment relative to its mate; and f) compressively contacting the exterior of the mold tunnel section with a roller member to thereby substantially maintain alignment of the mold tunnel section normal to the direction of mold tunnel travel.

12. The method according to claim 11 further comprising the step of imparting rotational force to the roller where the tangential speed of roller is tuned so that the angular velocity of the contact surface of the roller is substantially equal to the velocity of translation of the traveling mold tunnel.

13. The method according to claim 12 where the alignment element includes a matching set of projecting lugs from each of said mold block pairs and a keyway dimensioned to correspond to the lugs and further comprising the step of establishing the lugs in the keyway so as to cooperate and maintain alignment of the clamshell half block sections.

* * * * *